United States Patent Office 3,189,317
Patented June 15, 1965

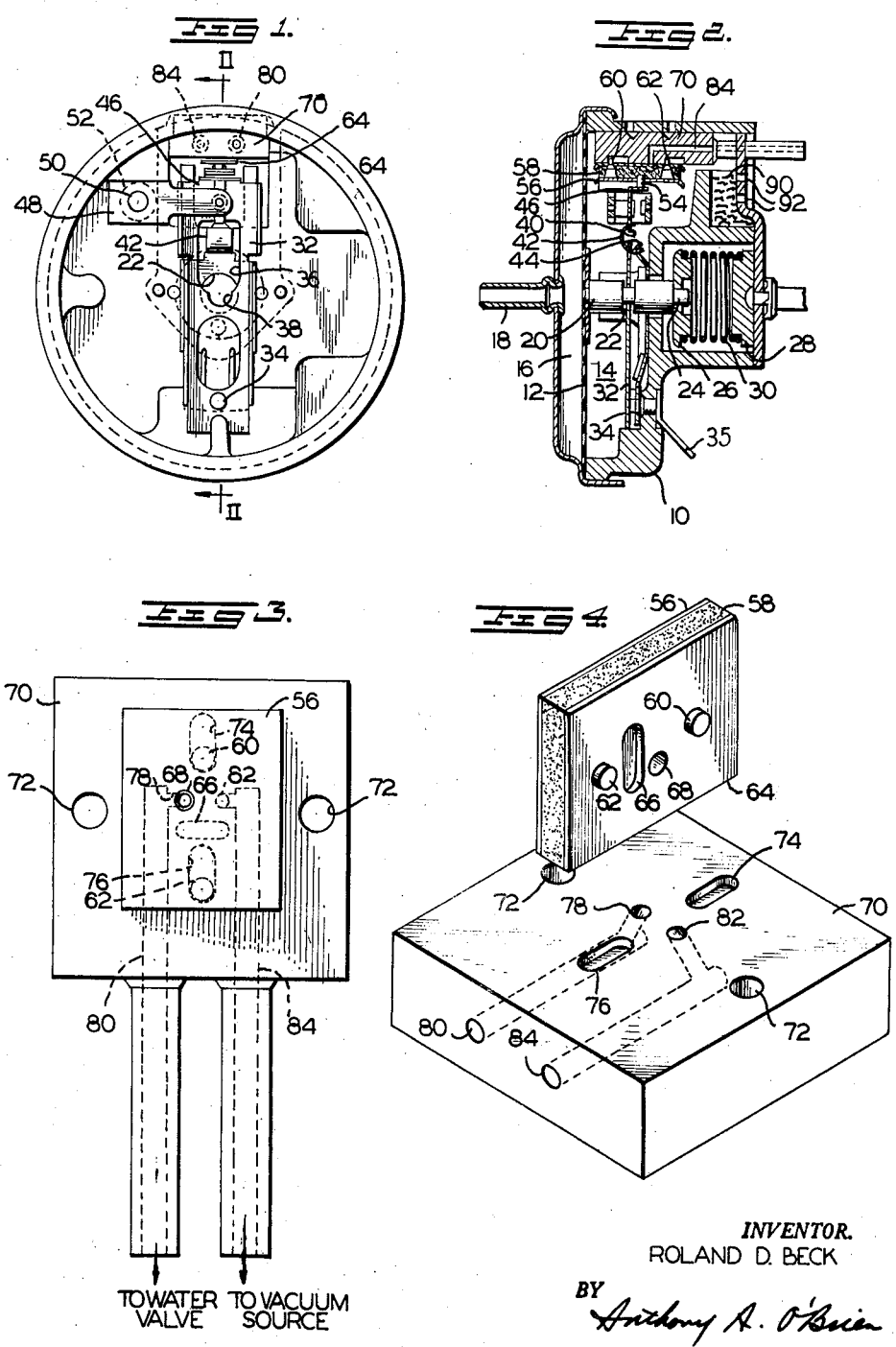

3,189,317
PNEUMATIC LEVEL CONTROL
Roland D. Beck, Anaheim, Calif., assignor to Robertshaw Controls Company, a corporation of Delaware
Filed Nov. 10, 1961, Ser. No. 151,474
11 Claims. (Cl. 251—75)

This invention relates to a water level control device and in particular to a pneumatic control for regulating the amount of water in a vessel such as a washing machine.

In the operation of modern washing machines, it is conventional practice to include some form of water level control which permits a flow of water into the washing machine and is operative in response to a predetermined level of the water to cut off the flow of water. In some prior art mechanisms, the water level control operates a switch, electrically connected to a solenoid actuated valve that is associated with the water filling apparatus. In the use of pneumatically actuated devices, the water level control operates a valve which in turn controls the pneumatic actuation of water control apparatus. The present invention introduces a novel water level control of the pneumatic type which is more economical and more efficient than the prior art devices.

An object of this invention is to construct a pressure operated device in order to control a pneumatic flow.

Another object of this invention is to utilize a thin flexible sheet as a valving element to control a pneumatic vacuum flow.

This invention has another object in that a pressure responsive control device simultaneously actuates an electric switch and a pneumatic flow control element.

It is a further object of this invention to incorporate an electric switch and a pneumatic flow control into a compact structure in a water level control device.

A preferred embodiment of this invention includes a diaphragm adapted to operate a switch arm in response to a predetermined water level. The switch arm causes snap action of electrical contacts and is operatively connected to a valving element for simultaneous actuation thereof and thereby controls a pneumatic flow to a pneumatically operated control device.

Additional objects and advantages of this invention will become apparent from the following description taken in connection with the accompanying drawing wherein:

FIG. 1 is a plan view with parts removed of a control device embodying this invention;

FIG. 2 is a sectional view taken along line II—II of FIG. 1 but with parts added;

FIG. 3 is a schematic diagram on an enlarged scale of certain details of FIG. 1; and FIG. 4 is an exploded perspective showing the control element in a tilted position.

While the preferred embodiment of this invention is being described with relation to particular operations associated with a washing machine, it is to be understood that it has other uses and is readily adaptable to control the actuation of many other pneumatic mechanisms.

As is illustrated in FIGS. 1 and 2, a hollow casing 10 is interiorly separated by a diaphragm 12 into a pair of chambers 14 and 16. A tubing 18 has one end communicating with chamber 16 to form a sealed air chamber; the other end of tubing 18 includes any suitable means for compressing the air in tube 18 in response to the particular operation of the apparatus that is to be controlled. For example, tubing 18 is adapted to be connected to a sump at the bottom of a washing machine (not shown) and as the water level in the machine increases, the air column in tubing 18 is compressed causing a pressure increase in chamber 16 which moves the diaphragm 12 to the right as viewed in FIG. 2.

The side of diaphragm 12 facing the chamber 14 is integrally secured to an actuating shaft 20 which has a necked-down portion 22 intermediate its ends and a reduced portion 24 on its free end. The reduced portion 24 provides a mounting for an apertured retaining plate 26. A similar retaining plate 28 is secured to a wall of the casing 10 in alignment with the plate 26 and a coil spring 30 is mounted in compression between the two plates 26 and 28. The coil spring 30 acts on the retaining plate 26 and shaft 20 to exert a biasing force on the atmospheric pressure side of the diaphragm 12.

A switch arm 32 of a snap acting mechanism is disposed in the chamber 14 and has one end 34 secured to a supporting wall in the casing 10 and electrically connected to at common terminal post 35. The switch arm 32 is a flat rectangular strip having an opening 36 intermediate its ends. The edge of the opening nearest the mounting end 34 is reduced to form a semi-circular edge 38 which is assembled in the necked-down portion 22 of the shaft 20. As is shown in FIG. 2, the width of the necked-down portion 22 is larger than the thickness of the switch arm 32 forming a lost motion connection with edge 38 so that the switch arm 32 of the snap acting mechanism will not be subjected to fluctuation and fluttering by the diaphragm 12. The opposite edge of the opening 36 has a projection 40 which extends through an opening in one end of a U-shaped rolling spring 42. A similar opening in the other end of the U-shaped rolling spring 42 receives a projection 44 which is secured to an internal wall in the casing 10. When the switch arm 32 is flexed to the right as viewed in FIG. 2, the rolling spring 42 is pivoted about the fixed projection 44, whereupon the free end 46 of switch arm 32 is moved with a snap action. The free end 46 of switch arm 32 carries a perpendicularly disposed blade 48 which has a contact 50 for cooperation with the fixed contact 52 secured to an internal wall of the casing 10.

The free end 46 of switch arm 32 carries a pin 54 which centrally extends through a plate 56 into a back-up block 58. The plate 56 is provided with a pair of spaced projections 60 and 62 which extend through the block 58 and terminate in spaced relation to the surface of the block 58. The block 58 consists of a piece of resilient porous material disposed between the plate 56 and a thin flexible valve element 64 which may be made of any suitable plastic material conforming to the same general outline as the block 58. A pair of spaced apertures on the valve disc 64 receive the ends of the projections 60 and 62 whereby the flexible valve disc 64 is carried thereon. The flexible valve element 64 is provided with a blister portion forming a channel 66 having a generally rectangular configuration. Spaced above the channel 66, the flexible valve element 64, the block 58, and the plate 56 are drilled to define a through-bore 68.

The plate 56, the resilient porous block 58 and the valve element 64 are movable as a unit with the valve element 64 being in surface contact with the face of a reading head or valve block 70. The resilient porous block 58 acts as a plastic foam to hold the flexible valve element 64 against the reading head 70 in such a manner as to permit it to conform to any surface irregularities. A plurality of mounting apertures 72 permit the valve block 70 to be securely fastened in the casing 10 as by cap screws. The surface of valve block 70 has a pair of aligned spaced recesses 74 and 76 of generally rectangular outline, in which the ends of the projections 60 and 62 are respectively reciprocated to define the limits of movement of the valve element 64. The valve block 70 has a pair of conduits for conducting a pneumatic flow through the valve block. The first conduit has one end 78 opening into the valve block surface and another end 80 opening to an exterior surface for suitable connection to a pneumatically operated control device such as a water valve for controlling a flow of water to the washing machine. The second conduit has one end 82 opening into the valve block surface in aligned spaced relation to the first opening 78 and another end 84 opening to an exterior surface for suitable connection to a vacuum source, such as a vacuum pump (not shown).

As is illustrated in FIG. 3, the thin flexible valve element 64 slides relative to the valve surface of the valve block 70 so that in its upper poistion, the blister 66 spans the conduit openings 78 and 82 and in its lower position, the conduit opening 82 is sealed and the conduit opening 78 communicates with the through-bore 68 so as to be subject to the atmospheric conditions in the casing 10. It should be noted that the through-bore 68 may be replaced by other arrangements, for instance, the flexible valve element 64 could be so loosely carried by the pins 60 and 62 that communication between the conduit opening 78 and the interior of the casing 10 is established by the space between the loose fitting valve element 64 and the valve block 70. Any such communication arrangement is permissible inasmuch as the use of vacuum will create a suction on the flexible valve element 64 in the area of its contact with the vacuum source port 82. Because of such suction and by the use of a flexible valve element, there is no leakage of the vacuum flow.

Since the atmosphere within the casing chamber 14 is utilized to establish atmospheric pressure in the pneumatically operated control device associated with the water flow valve, it is proposed to prevent impurities from clogging the flexible valve element 64. The casing 10 is provided with a filter 90, of any suitable filtering material, which is disposed in an inlet chamber adjacent a pair of atmospheric ports 92. The interior of casing 10 is sealed to the atmosphere except for the two ports 92 so that all air entering the chamber 14 must pass through the filtering material 90.

In operation of the above described water level control, when it is desired to fill a washing machine with water, the various components are positioned as shown in FIG. 2 wherein the flexible valve element 64 has its channel 66 spanning the two conduit openings 78 and 82. Thus, the pneumatically operated control device associated with the water flow valve is actuated by being subjected to a vacuum traced as follows: from the pneumatically operated control device, through the conduits 80 and 78, under the flexible valve blister 66 and through the conduits 82 and 84 to a vacuum pump (not shown). As soon as the water in the washing machine reaches a predetermined level, the air pressure in casing chamber 16 increases and moves the diaphragm to the right as viewed in FIG. 2. The following movement of shaft 20 causes the switch arm 32 to be actuated whereupon the flexible valve element 64 is moved with a snap action to its second position which is represented by the various components as shown in FIG. 3. In the second position of the flexible valve element 64, the channel 66 is moved out of communication with the conduit openings 78 and 82, the conduit opening 82 is sealed by the suction on the flexible valve element 64, and the conduit opening 78 is in communication with the atmosphere in the chamber 14. The pneumatically operated control device is now subjected to atmospheric pressure and is returned to its normal position wherein the flow of water is cut off to the washing machine.

When the switch arm 32 is actuated, there is a simultaneous operation of the switch blade 48 causing a closing of an electric circuit for other control devices associated with a washing machine such as a timer motor of a programmer (not shown) to initiate a programming function.

Inasmuch as the present invention is subjected to many modifications and various changes in structural details, it is intended that the foregoing description of the preferred embodiment shown in the drawing shall be interperted as illustrative and not in a limiting sense.

What is claimed is:

1. In a pneumatic control device, the combination comprising a casing, conduits opening into said casing for permitting a vacuum flow therethrough, diaphragm means operatively disposed in said casing, flexible valve means disposed adjacent the openings of said conduits, means interconnecting said diaphragm means and said flexible valve means for operating the same in response to operation of said diaphragm means, and channel means on said flexible valve means for channelling the vacuum flow between the openings of said conduits, said flexible valve means being flexed in response to suction of the vacuum flow whereby there is no leakage of the vacuum flow.

2. In a pneumatic control device, the combination comprising a casing, a valve block having a plurality of conduits for permitting a vacuum flow therethrough, diaphragm means operatively disposed in said casing, a flexible valve element disposed for surface contact with said valve block, snap acting means operatively disposed between said diaphragm means and said flexible valve element for moving the same with a snap action, and an integrally formed blister on said flexible valve element defining a flow channel for channelling the vacuum flow between the conduits in said valve block, said flexible valve element adhering to said valve block in response to suction of the vacuum flow whereby there is no leakage of the vacuum flow.

3. The combination as recited in claim 2 wherein lost motion means form a connection between said diaphragm means and said snap acting means.

4. In a pneumatic control device, the combination comprising a casing, a valve block in said casing having a plurality of conduits for conducting a vacuum flow therethrough, diaphragm means in said casing, flexible valve means slidably disposed adjacent said valve block and controlling the vacuum flow through said conduits, a snap acting mechanism operatively disposed in said casing for actuation by said diaphragm means, an operative connection between said snap action mechanism and said flexible valve means whereby said flexible valve means is operated by said snap acting mechanism, and a lost motion connection between said snap acting mechanism and said diaphragm means, said flexible valve means being sealingly drawn into surface contact with said valve block in response to suction of the vacuum flow to prevent leakage of the vacuum flow.

5. The combination as recited in claim 4 wherein said flexible valve means includes channel means integrally formed on said flexible valve means for channelling a vacuum flow between the conduits in said valve block.

6. In a pneumatic control device, the combination comprising a casing, diaphragm means in said casing, a snap acting mechanism operatively connected to said diaphragm means, a valve block having a plurality of conduits for permitting a vacuum flow therethrough, a plate member operatively connected to said snap acting mechanism for movement thereby, a flexible valve element carried by said plate member and disposed for surface contact with said valve block, channel means integrally formed on said flexible valve element for channelling a vacuum flow between said conduits, a resilient porous element disposed between said plate member and said flexible valve element, said resilient porous element maintaining said flexible valve element in surface contact with said valve block, and means for guiding the movement of said flexible valve element relative to said valve block.

7. The combination as recited in claim 6 wherein said flexible valve element is provided with exhaust means movable into registry with one of said conduits whereby the said one conduit is subjected to atmospheric conditions in said casing.

8. The combination as recited in claim 7 wherein said casing is provided with filter means to filter the atmosphere entering said casing.

9. In a pneumatic control device, the combination comprising a casing, a snap acting mechanism including an arm operatively disposed in said casing, diaphragm means operatively connected to said arm causing movement thereof between controlling positions, a valve block fixed in said casing having a plurality of conduits, one end of each conduit opening exteriorly of said casing for connection to a pneumatic flow, the other end of each conduit opening interiorly of said casing, a movable valve assembly unit slidably disposed on said valve block and including a plate member, a flexible valve member and a block of resilient porous material therebetween, said flexible valve member being biased into sliding surface contact with said valve block by said resilient porous material and being operatively disposed to control the said other end of each conduit, an operative connection between said arm and said plate member whereby movement of said arm effects operation of said valve assembly unit, and means for guiding the movement of said valve assembly unit relative to said valve block.

10. The combination as recited in claim 9 wherein said flexible valve member has an integrally formed raised blister defining a flow channel to establish communication between the said other ends of adjacent conduits.

11. The combination as recited in claim 10 wherein said flexible valve member is provided with exhaust means movable into registry with one of the said other ends of adjacent conduits.

References Cited by the Examiner
UNITED STATES PATENTS

| | | | |
|---|---|---|---|
| 2,636,093 | 4/53 | Clark et al. | 200—83 |
| 2,906,132 | 9/59 | Moody et al. | 200—83 |
| 2,921,158 | 1/60 | Taylor | 200—83 |
| 3,021,823 | 2/62 | Dinkelkamp | 251—75 |

BERNARD A. GILHEANY, *Primary Examiner.*